US012437366B2

(12) United States Patent
Ren et al.

(10) Patent No.: US 12,437,366 B2
(45) Date of Patent: Oct. 7, 2025

(54) TARGET DETECTION METHOD, COMPUTER DEVICE, COMPUTER-READABLE STORAGE MEDIUM, AND VEHICLE

(71) Applicant: Anhui NIO Autonomous Driving Technology Co., Ltd., Hefei (CN)

(72) Inventors: Guanghui Ren, Shanghai (CN); Huan Qin, Shanghai (CN); Xindong He, Shanghai (CN); Qi Xiong, Shanghai (CN); Chao Peng, Shanghai (CN)

(73) Assignee: Anhui NIO Autonomous Driving Technology Co., Ltd., Hefei (CN)

( * ) Notice: Subject to any disclaimer, the term of this patent is extended or adjusted under 35 U.S.C. 154(b) by 220 days.

(21) Appl. No.: 18/321,438

(22) Filed: May 22, 2023

(65) Prior Publication Data

US 2023/0377105 A1 Nov. 23, 2023

(30) Foreign Application Priority Data

May 23, 2022 (CN) .......................... 202210564922.X

(51) Int. Cl.
*G06T 5/30* (2006.01)
*G06F 18/20* (2023.01)

(52) U.S. Cl.
CPC ................ *G06T 5/30* (2013.01); *G06F 18/29* (2023.01); *G06T 2207/10028* (2013.01);
(Continued)

(58) Field of Classification Search
CPC ........... G06F 18/29; G06T 2207/10028; G06T 2207/20216; G06T 2207/20221;
(Continued)

(56) References Cited

U.S. PATENT DOCUMENTS

2019/0325605 A1* 10/2019 Ye ........................ G06F 18/2431
2019/0355153 A1* 11/2019 Singh .................... G06F 16/745
(Continued)

FOREIGN PATENT DOCUMENTS

| CN | 113239726 | 8/2021 |
| CN | 113284163 | 8/2021 |

(Continued)

OTHER PUBLICATIONS

Akadas et al. "3D Semantic Segmentation for Large-Scale Scene Understanding," ACCV 2020 Workshops, 2021, LNCS 12628, pp. 87-102.
(Continued)

*Primary Examiner* — Ming Wu
(74) *Attorney, Agent, or Firm* — Sheridan Ross P.C.

(57) ABSTRACT

The disclosure relates to the technical field of autonomous driving, and specifically provides a target detection method, a computer device, a computer-readable storage medium, and a vehicle, to solve the problem of detecting a target in a timely and accurate manner. For this purpose, the method of the disclosure includes: rasterizing point cloud space of three-dimensional point clouds in a vehicle driving environment to form a plurality of three-dimensional point cloud grids, and using point cloud grids including three-dimensional point clouds as target point cloud grids; determining a convolution dilation rate based on sparsity of the target point cloud grid; dilating a sparse convolution based on the convolution dilation rate; extracting a point cloud grid feature of the target point cloud grid by using a dilated sparse convolution; weighting the point cloud grid feature by using an attention mechanism to obtain a global point cloud feature; and performing target detection based on the global point cloud feature. In this way, both a remote target and a close target can be accurately detected. In addition, using the
(Continued)

sparse convolution for detection can reduce the calculation amount and improve the detection efficiency.

15 Claims, 3 Drawing Sheets

(52) U.S. Cl.
CPC .............. *G06T 2207/20216* (2013.01); *G06T 2207/20221* (2013.01); *G06T 2207/30252* (2013.01)

(58) Field of Classification Search
CPC . G06T 2207/30252; G06T 5/30; G06V 10/82; G06V 20/58; G06V 20/64
See application file for complete search history.

(56) References Cited

U.S. PATENT DOCUMENTS

| | | | | |
|---|---|---|---|---|
| 2019/0370418 | A1* | 12/2019 | Zeng | G06F 30/20 |
| 2019/0392093 | A1* | 12/2019 | Huang | G06T 17/20 |
| 2020/0380760 | A1* | 12/2020 | Vosoughi | H04N 19/54 |

FOREIGN PATENT DOCUMENTS

| | | |
|---|---|---|
| WO | WO 2021/115081 | 6/2021 |
| WO | WO 2022/017147 | 1/2022 |

OTHER PUBLICATIONS

Yi et al. "SegVoxelNet: Exploring Semantic Context and Depth-aware Features for 3D Vehicle Detection form Point Cloud," 2020 IEEE International Conference on Robotics and Automation (ICRA), May 31-Aug. 31, 2020, Paris, France, pp. 2274-2280.
Zhou "How does sparse convolution work?" Towards Data Science, Dec. 27, 2020, 15 pages [retrieved online from: towardsdatascience.com/how-does-sparse-convolution-work-3257a0a8fd1].
Official Action with English Translation for China Patent Application No. 202210564922.X, dated Jun. 22, 2024, 16 pages.
Extended Search Report for European Patent Application No. 23174498.8, dated Sep. 7, 2023, 4 pages.
Official Action for European Patent Application No. 23174498.8, dated Sep. 19, 2023, 8 pages.

* cited by examiner

TARGET DETECTION METHOD, COMPUTER DEVICE, COMPUTER-READABLE STORAGE MEDIUM, AND VEHICLE

CROSS-REFERENCE TO RELATED APPLICATIONS

This application claims the benefit of China Patent Application No. 202210564922.X filed May 23, 2022, the entire contents of which are incorporated herein by reference in its entirety.

TECHNICAL FIELD

The disclosure relates to the technical field of autonomous driving, and specifically provides a target detection method, a computer device, a computer-readable storage medium, and a vehicle.

BACKGROUND

To ensure driving safety of a vehicle, targets such as vehicles or pedestrians in a driving environment usually need to be detected in a driving process of the vehicle, and the vehicle is controlled to keep a certain safety distance from the targets based on positions of the targets. However, current conventional target detection methods are only applicable to detecting close targets, but inapplicable to detecting remote targets quickly and accurately. When the vehicle travels at a high speed, a larger safety distance is required. If a remote target cannot be detected in a timely and accurate manner, a sufficient safety distance cannot be ensured, increasing the driving risk of the vehicle.

Accordingly, there is a need for a novel technical solution to solve the problem described above.

BRIEF SUMMARY

To overcome the above disadvantages, the disclosure is proposed to provide a target detection method, a computer device, a computer-readable storage medium, and a vehicle that solve or at least partially solve a technical problem of how to detect a remote target in a timely and accurate manner.

According to a first aspect, the disclosure provides a target detection method. The method includes:
  rasterizing point cloud space of three-dimensional point clouds in a vehicle driving environment to form a plurality of three-dimensional point cloud grids, and using point cloud grids including three-dimensional point clouds as target point cloud grids;
  determining a convolution dilation rate corresponding to each of the target point cloud grids based on sparsity of the target point cloud grid, where the convolution dilation rate is positively correlated with the sparsity;
  dilating a sparse convolution based on the convolution dilation rate to form a dilated sparse convolution;
  extracting a point cloud grid feature of the corresponding target point cloud grid by using the dilated sparse convolution;
  weighting the point cloud grid feature by using an attention mechanism to obtain a global point cloud feature; and
  performing target detection based on the global point cloud feature.

In a technical solution of the target detection method, before the step of determining a convolution dilation rate corresponding to each of the target point cloud grids based on sparsity of the target point cloud grid, the method further includes: determining the sparsity of the target point cloud grid in the following manner
  obtaining point cloud grids adjacent to a current target point cloud grid within a preset neighborhood range;
  determining a grid number of target point cloud grids in the adjacent point cloud grids; and
  determining sparsity of the current target point cloud grid based on the grid number.

In a technical solution of the target detection method, the step of determining a convolution dilation rate corresponding to each of the target point cloud grids based on sparsity of the target point cloud grid specifically includes: determining a convolution dilation rate corresponding to the current target point cloud grid based on the sparsity of the current target point cloud grid and by using the following formula:

$$\begin{cases} d_r = \lceil N \times s_1 \rceil, \dfrac{N-M}{N} = 1 \\ d_r = \left\lceil \dfrac{N}{M} \times s_2 \right\rceil, 0 \le \dfrac{N-M}{N} < 1 \end{cases},$$

where
  $d_r$ represents the convolution dilation rate, N represents a grid number of adjacent point cloud grids, M represents the grid number of target point cloud grids in the adjacent point cloud grids, $$\dfrac{N-M}{N}$$

represents the sparsity, $s_1$ and $s_2$ represent preset hyperparameters, and $\lceil\ \rceil$ represents the ceiling operation.

In a technical solution of the target detection method, the step of weighting the point cloud grid feature by using an attention mechanism to obtain a global point cloud feature specifically includes:
  re-rasterizing the point cloud space of the three-dimensional point clouds in the vehicle driving environment to form a plurality of three-dimensional super grids, where the super grid includes a plurality of point cloud grids;
  for each super grid, weighting a point cloud grid feature of each point cloud grid in the super grid by using the attention mechanism to obtain a first attention-weighted feature of each point cloud grid, and determining a super grid feature of the super grid based on the first attention-weighted feature;
  separately weighting super grid features of the super grids by using the attention mechanism to obtain second attention-weighted features of the super grids; and
  obtaining the global point cloud feature based on the first attention-weighted feature of each point cloud grid and a second attention-weighted feature of a super grid feature to which each point cloud grid belongs.

In a technical solution of the target detection method, the step of obtaining the global point cloud feature based on the first attention-weighted feature of each point cloud grid and a second attention-weighted feature of a super grid feature to which each point cloud grid belongs specifically includes:

merging the first attention-weighted feature of each point cloud grid and the second attention-weighted feature of the super grid feature to which each point cloud grid belongs, and obtaining the global point cloud feature based on a feature merging result; or merging a super grid feature and the second attention-weighted feature of the super grid feature to which each point cloud grid belongs and the first attention-weighted feature of each point cloud grid, and obtaining the global point cloud feature based on a feature merging result.

In a technical solution of the target detection method, the step of determining a super grid feature of the super grid based on the first attention-weighted feature specifically includes:

averaging first attention-weighted features of the point cloud grids in the super grid to obtain an average feature, and using the average feature as the super grid feature of the point cloud super grid.

In a technical solution of the target detection method, before the step of rasterizing point cloud space of three-dimensional point clouds in a vehicle driving environment to form a plurality of three-dimensional point cloud grids, the method further includes:

obtaining the three-dimensional point clouds in the vehicle driving environment by using a remote environment sensing device.

According to a second aspect, a computer device is provided. The computer device includes at least one processor and a storage apparatus configured to store a plurality of program codes, and the program codes are adapted to be loaded and executed by the at least one processor to perform the target detection method in any one of the above technical solutions of the target detection method.

According to a third aspect, a non-transitory computer-readable storage medium is provided. A plurality of program codes are stored in the non-transitory computer-readable storage medium, and the program codes are adapted to be loaded and executed by at least one processor to perform the target detection method in any one of the above technical solutions of the target detection method.

According to a fourth aspect, a vehicle is provided. The vehicle includes the computer device described in the above technical solution of the computer device.

The above one or more technical solutions of the disclosure have at least one or more of the following beneficial effects:

During implementation of the technical solutions of the disclosure, point cloud space of three-dimensional point clouds in a vehicle driving environment may be rasterized to form a plurality of three-dimensional point cloud grids, and point cloud grids including three-dimensional point clouds may be used as target point cloud grids. After the target point cloud grids are determined, a convolution dilation rate corresponding to each target point cloud grid is determined based on sparsity of the target point cloud grid. The convolution dilation rate is positively correlated with the sparsity. A sparse convolution is dilated based on the convolution dilation rate to form a dilated sparse convolution. A point cloud grid feature of the corresponding target point cloud grid is extracted by using the dilated sparse convolution. Finally, the point cloud grid feature is weighted by using an attention mechanism to obtain a global point cloud feature, and target detection is performed based on the global point cloud feature.

In the above implementation, abundant features can be extracted from both a remote target and a close target to perform target detection, such that the accuracy of target detection is improved. In addition, point cloud grid features extracted by using sparse convolutions are sparse. Using the sparse point cloud grid features to perform target detection can significantly reduce the calculation amount, to reduce time of target detection.

Further, during implementation of the technical solutions of the disclosure, when the point cloud grid feature is weighted by using the attention mechanism to obtain the global point cloud feature, the point cloud space of the three-dimensional point clouds in the vehicle driving environment is re-rasterized to form a plurality of three-dimensional super grids. The super grid includes a plurality of point cloud grids. For each super grid, a point cloud grid feature of each point cloud grid in the super grid is weighted by using the attention mechanism to obtain a first attention-weighted feature of each point cloud grid, and a super grid feature of the super grid is determined based on the first attention-weighted feature. Super grid features of the super grids are separately weighted by using the attention mechanism to obtain second attention-weighted features of the super grids. The global point cloud feature is obtained based on the first attention-weighted feature of each point cloud grid and a second attention-weighted feature of a super grid feature to which each point cloud grid belongs.

The global point cloud feature obtained in the above implementation fuses a global feature of the point cloud grid feature in a local area of the super grid and a global feature of the point cloud grid feature in the entire point cloud space, such that global features of different levels can be taken into account when target detection is performed based on the global point cloud feature, thereby further improving the accuracy of target detection.

BRIEF DESCRIPTION OF THE SEVERAL VIEWS OF THE DRAWINGS

The disclosed content of the disclosure will become more readily understood with reference to the accompanying drawings. Those skilled in the art readily understand that these accompanying drawings are merely for illustrative purposes and are not intended to limit the scope of protection of the disclosure. In the accompanying drawings.

DETAILED DESCRIPTION

Some implementations of the disclosure are described below with reference to the accompanying drawings. Those skilled in the art should understand that these implementations are only used to explain the technical principles of the disclosure, and are not intended to limit the scope of protection of the disclosure.

In the description of the disclosure, a "processor" may include hardware, software, or a combination thereof. The processor may be a central processing unit, a microprocessor, a graphics processing unit, a digital signal processor, or any other suitable processor. The processor has a data and/or signal processing function. The processor may be implemented in software, hardware, or a combination thereof. A computer-readable storage medium includes any suitable medium that can store program code, such as a magnetic disk, a hard disk, an optical disc, a flash memory, a read-only memory, or a random access memory.

Figure 1:
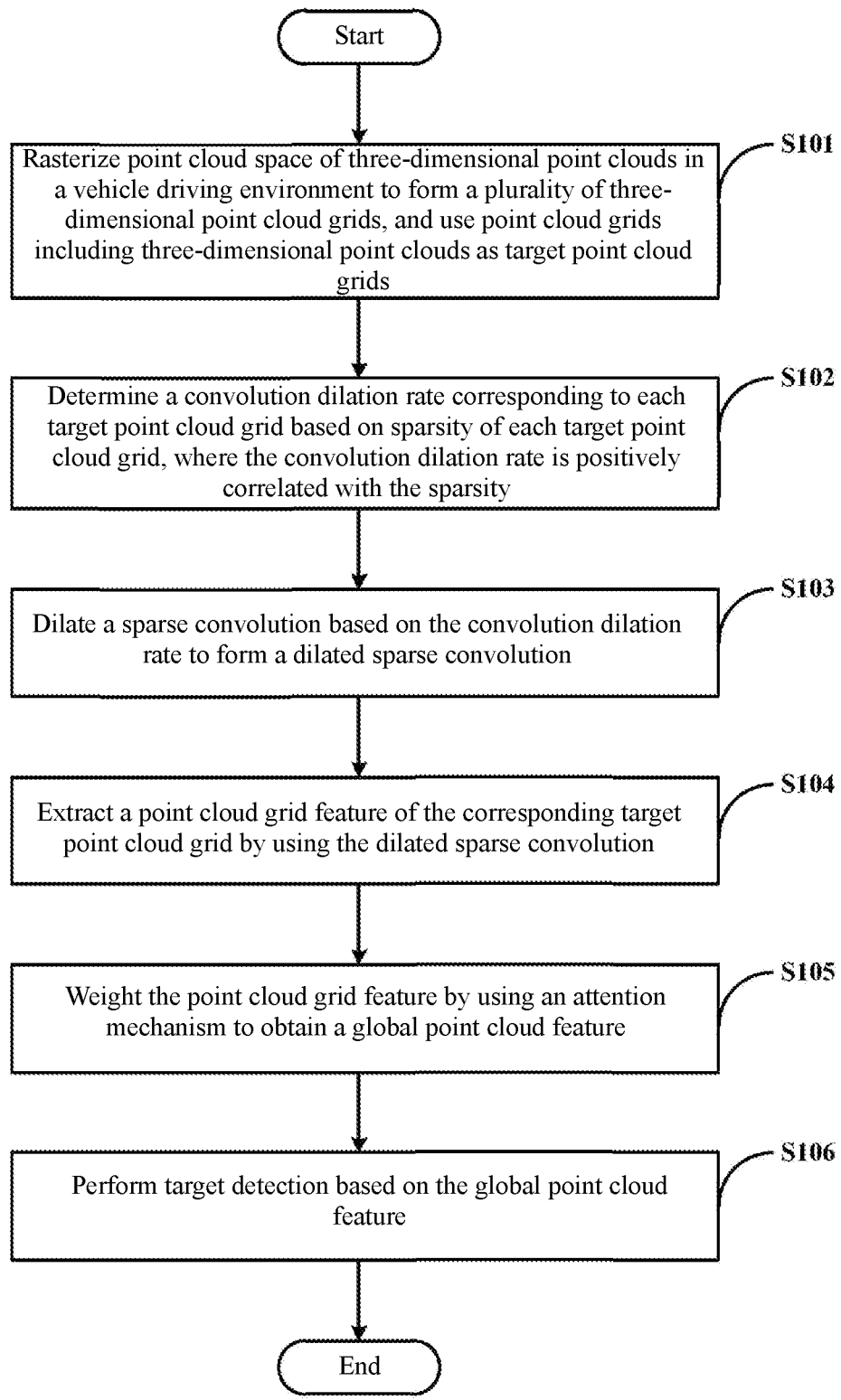
FIG. 1 is a schematic flowchart of main steps of a target detection method according to an embodiment of the disclosure.

FIG. 1 is a schematic flowchart of main steps of a target detection method according to an embodiment of the disclosure. As shown in FIG. 1, the target detection method in this embodiment of the disclosure mainly includes step S101 to step S106 below.

In step S101, point cloud space of three-dimensional point clouds in a vehicle driving environment is rasterized to form a plurality of three-dimensional point cloud grids, and point cloud grids including three-dimensional point clouds are used as target point cloud grids.

The three-dimensional point cloud refers to three-dimensional data determined based on an echo signal reflected back to a vehicle by an environment point in the vehicle driving environment after the environment point receives an electromagnetic wave sent from the vehicle to the environment point. The three-dimensional data includes coordinates of the environment point in a three-dimensional coordinate system. In this embodiment of the disclosure, the vehicle may send the electromagnetic wave to the environment point in the driving environment by using an environment sensing device such as a radar, including but not limited to a millimeter-wave radar and a lidar. In some implementations, the three-dimensional point clouds in the vehicle driving environment may be obtained by a remote environment sensing device, and three-dimensional point clouds in a relatively distant range can be obtained by the remote environment sensing device, so that a remote target can be detected. In a preferred implementation, the lidar may be used as the remote environment sensing device to obtain the three-dimensional point clouds in the vehicle driving environment.

The point cloud space is three-dimensional space formed by a point cloud coordinate system of the three-dimensional point clouds. The point cloud space is divided based on three dimensions of x, y, and z axes in the point cloud coordinate system to form a plurality of three-dimensional point cloud grids. One point cloud grid is one volume pixel of the point cloud space.

In step S102, a convolution dilation rate corresponding to each target point cloud grid is determined based on sparsity of the target point cloud grid. The convolution dilation rate is positively correlated with the sparsity.

The sparsity represents a distribution condition of other target point cloud grids surrounding the target point cloud grid. A larger number of other surrounding target point cloud grids indicate smaller sparsity; and a smaller number of other surrounding target point cloud grids indicate larger sparsity.

The convolution dilation rate being positively correlated with the sparsity means that the larger the sparsity, the larger the convolution dilation rate is, and the smaller the sparsity, the smaller the convolution dilation rate is.

Smaller sparsity indicates that there are more three-dimensional point clouds surrounding the target point cloud grid (more other surrounding target point cloud grids indicate more three-dimensional point clouds). A relatively small dilation rate is used to dilate a sparse convolution, and abundant local detail features may be extracted by using a dilated sparse convolution. Larger sparsity indicates that there are fewer three-dimensional point clouds surrounding the target point cloud grid (fewer other surrounding target point cloud grids indicate fewer three-dimensional point clouds). A relatively large dilation rate is used to dilate a sparse convolution, and a feature of a three-dimensional point cloud relatively far away from a current target point cloud grid may be extracted by using a dilated sparse convolution, to enrich a feature of the current target point cloud grid. In this way, abundant features can be extracted from both a remote target and a close target to perform target detection, such that the accuracy of target detection is improved.

In step S103, a sparse convolution is dilated based on the convolution dilation rate to form a dilated sparse convolution.

In this embodiment, a conventional dilation method in the field of convolution technologies may be used to dilate the sparse convolution by using the convolution dilation rate determined in step S102. A dilation method is not specifically limited in this embodiment of the disclosure, as long as the sparse convolution can be dilated based on the convolution dilation rate to form the dilated sparse convolution.

In step S104, a point cloud grid feature of the corresponding target point cloud grid is extracted by using the dilated sparse convolution.

In this embodiment, point cloud data of the target point cloud grid may be input to the dilated sparse convolution, and a convolution operation is performed on the input point cloud data by using the dilated sparse convolution to obtain the point cloud grid feature. When a plurality of layers of sparse convolutions are included, for the first layer of sparse convolutions, input point cloud data is an initial point cloud grid feature of the point cloud grid. For sparse convolutions of a layer other than the first layer, input point cloud data is output data of a previous layer of sparse convolutions.

In step S101, when the point cloud space of the three-dimensional point clouds in the vehicle driving environment is rasterized to form the plurality of three-dimensional point cloud grids, a coordinate average of three-dimensional point clouds in each point cloud grid may be calculated, and the coordinate average is used as an initial point cloud grid feature of each point cloud grid.

It should be noted that when a plurality of layers of sparse convolutions are included, each layer of sparse convolutions may be dilated according to the method described in step S102 and step S103 to form dilated sparse convolutions. In some other implementations, some sparse convolutions may be dilated according to the method described in step S102 and step S103 to form dilated sparse convolutions. Those skilled in the art can flexibly select a sparse convolution to be dilated according to actual requirements, and this is not specifically limited in this embodiment of the disclosure.

In step S105, the point cloud grid feature is weighted by using an attention mechanism to obtain a global point cloud feature.

In this embodiment, a global attention mechanism algorithm may be used to weight the point cloud grid feature to obtain the global point cloud feature.

The global point cloud feature obtained by weighting the point cloud grid feature by using the attention mechanism implements global information fusion of the point cloud grid feature, such that the accuracy of target detection can be further improved when target detection is performed based on the global point cloud feature.

In step S106, target detection is performed based on the global point cloud feature.

Targets in this embodiment include at least pedestrians, motor vehicles, non-motor vehicles, and the like. Those skilled in the art can flexibly set a target type to be detected according to actual requirements.

Based on the method described in step S101 to step S106, abundant features can be extracted from both a remote target and a close target to perform target detection, such that the accuracy of target detection is improved. In addition, using the sparse convolution for target detection can significantly reduce the calculation amount, to reduce time of target detection and provide the detection efficiency.

Step S102 and step S105 will be further described below.

Figure 2:
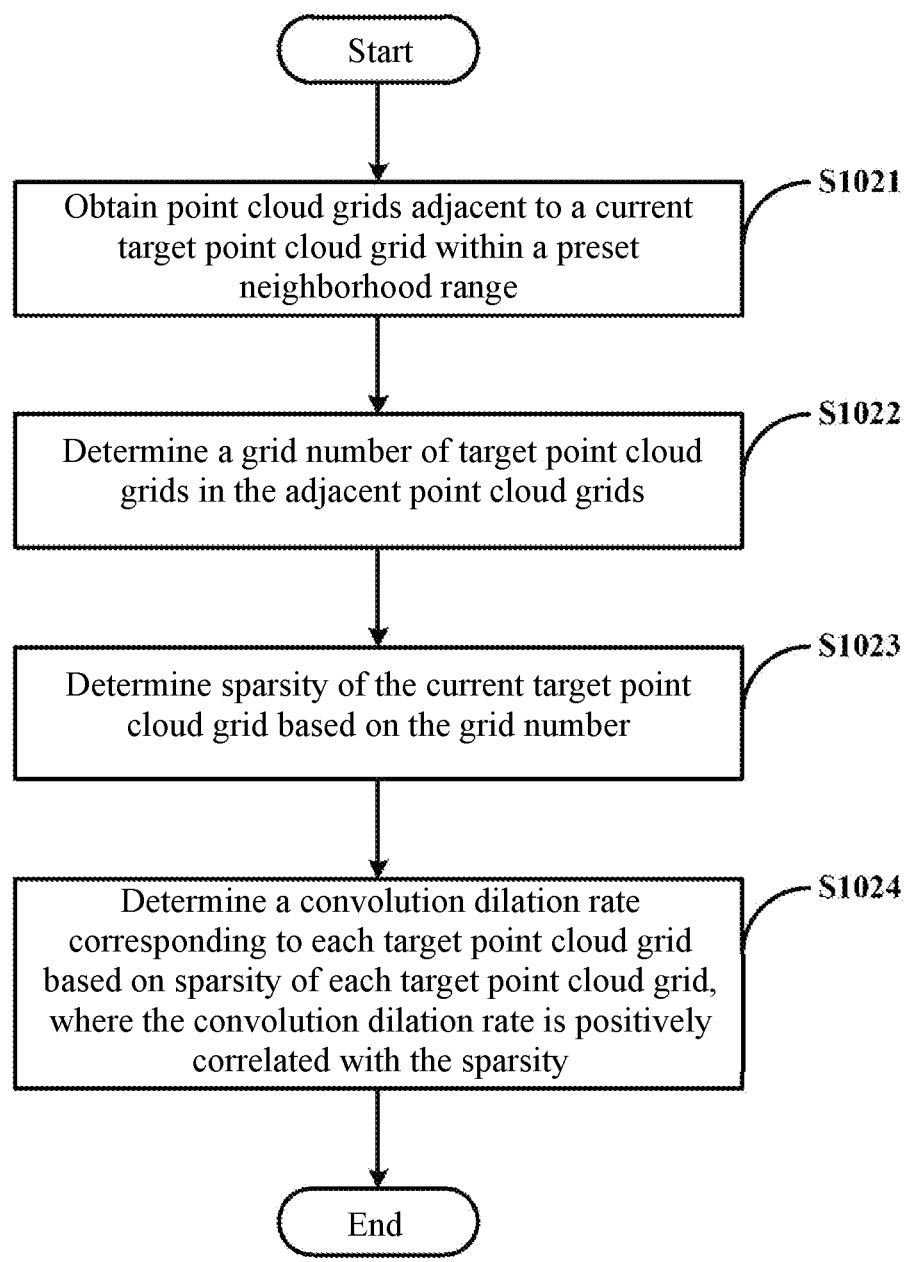
FIG. 2 is a schematic flowchart of main steps of a method for determining a convolution dilation rate corresponding to a target point cloud grid according to an embodiment of the disclosure.

Because the sparsity represents the distribution condition of the other target point cloud grids surrounding the target point cloud grid, the size of the sparsity may be determined based on the number of other target point cloud grids surrounding the target point cloud grid. Specifically, referring to FIG. 2, in some implementations of step S102, the sparsity of the target point cloud grid may be determined by performing step S1021 to step S1024 below.

In step S1021, point cloud grids adjacent to a current target point cloud grid within a preset neighborhood range are obtained.

The preset neighborhood range is a certain range centered on the current target point cloud grid in the point cloud space. Because the sparsity represents the distribution condition of the other target point cloud grids surrounding the target point cloud grid, the size of the preset neighborhood range directly affects the accuracy of determining the sparsity.

In some preferred implementations, the size of the preset neighborhood range may be determined based on a receptive field of the sparse convolution. If the sparsity of the target point cloud grid within the neighborhood range is relatively small, it indicates that there are a relatively large number of point cloud features in the receptive field of the sparse convolution, and abundant features can be extracted without expanding the receptive field by using a relatively large convolution dilation rate. If the sparsity of the target point cloud grid within the neighborhood range is relatively large, it indicates that there are a relatively small number of point cloud features in the receptive field of the sparse convolution, and the receptive field needs to be expanded by using a relatively large convolution dilation rate, to extract abundant features. Because a convolution kernel size can represent the size of the receptive field of the sparse convolution, in this implementation, the size of the neighborhood range may be determined based on a convolution kernel size of the sparse convolution. Specifically, if the convolution kernel size of the sparse convolution is D×D×D, the preset neighborhood range is a three-dimensional space range formed by D×D×D point cloud grids, where D>1. For a point cloud grid located in a central area of this three-dimensional space range, all of the other D×D×D−1 point cloud grids within the three-dimensional space range are point cloud grids adjacent to the point cloud grid. For example, the convolution kernel size of the sparse convolution is 3×3×3, and in a three-dimensional space range formed by 3×3×3 point cloud grids, for a point cloud grid located in a central area of this three-dimensional space range, the other 26 point cloud grids are grids adjacent to the point cloud grid.

Determining the preset neighborhood range based on the receptive field of the sparse convolution can evaluate the sparsity of the target point cloud grid more accurately, to improve the accuracy of determining the convolution dilation rate by using the sparsity.

In step S1022, a grid number of target point cloud grids in the adjacent point cloud grids is determined.

In step S1023, sparsity of the current target point cloud grid is determined based on the grid number.

The sparsity is negatively correlated with the grid number. A larger grid number indicates smaller sparsity, and a smaller grid number indicates larger sparsity. Specifically, in some implementations, the sparsity $S_p$ may be calculated by using the following Formula (1).

$$S_p = \frac{N-M}{N} \quad (1)$$

In Formula (1), N represents the total number of point cloud grids adjacent to the current target point cloud grid, and M represents the grid number of target point cloud grids in the adjacent point cloud grids.

In step S1024, a convolution dilation rate corresponding to each target point cloud grid is determined based on sparsity of the target point cloud grid.

The convolution dilation rate being positively correlated with the sparsity means that the larger the sparsity, the larger the convolution dilation rate is, and the smaller the sparsity, the smaller the convolution dilation rate is. Specifically, in some implementations, the convolution dilation rate corresponding to the target point cloud grid may be determined by using the following Formula (2).

$$\begin{cases} d_r = \lceil N \times s_1 \rceil, \frac{N-M}{N} = 1 \\ d_r = \lceil \frac{N}{M} \times s_2 \rceil, 0 \le \frac{N-M}{N} < 1 \end{cases} \quad (2)$$

In Formula (2), $d_r$ represents the convolution dilation rate, N represents the grid number of adjacent point cloud grids, M represents the grid number of target point cloud grids in the adjacent point cloud grids, $$\frac{N-M}{N}$$

represents the sparsity, $s_1$ and $s_2$ represent preset hyperparameters, and $\lceil \ \rceil$ represents the ceiling operation. It should be noted that those skilled in the art can flexibly set specific values of the preset hyperparameters $s_1$ and $s_2$ separately according to actual requirements. The values of $s_1$ and $s_2$ may be equal or unequal. For example, in some preferred implementations, the preset hyperparameters are $s_1=1$ and $s_2=1$.

According to step S1021 to step S1024, the sparsity of each target point cloud grid can be accurately determined, and further, the convolution dilation rate corresponding to each target point cloud grid can be accurately determined.

The above is a further description of step S102. Step S105 will be further described below.

Figure 3:
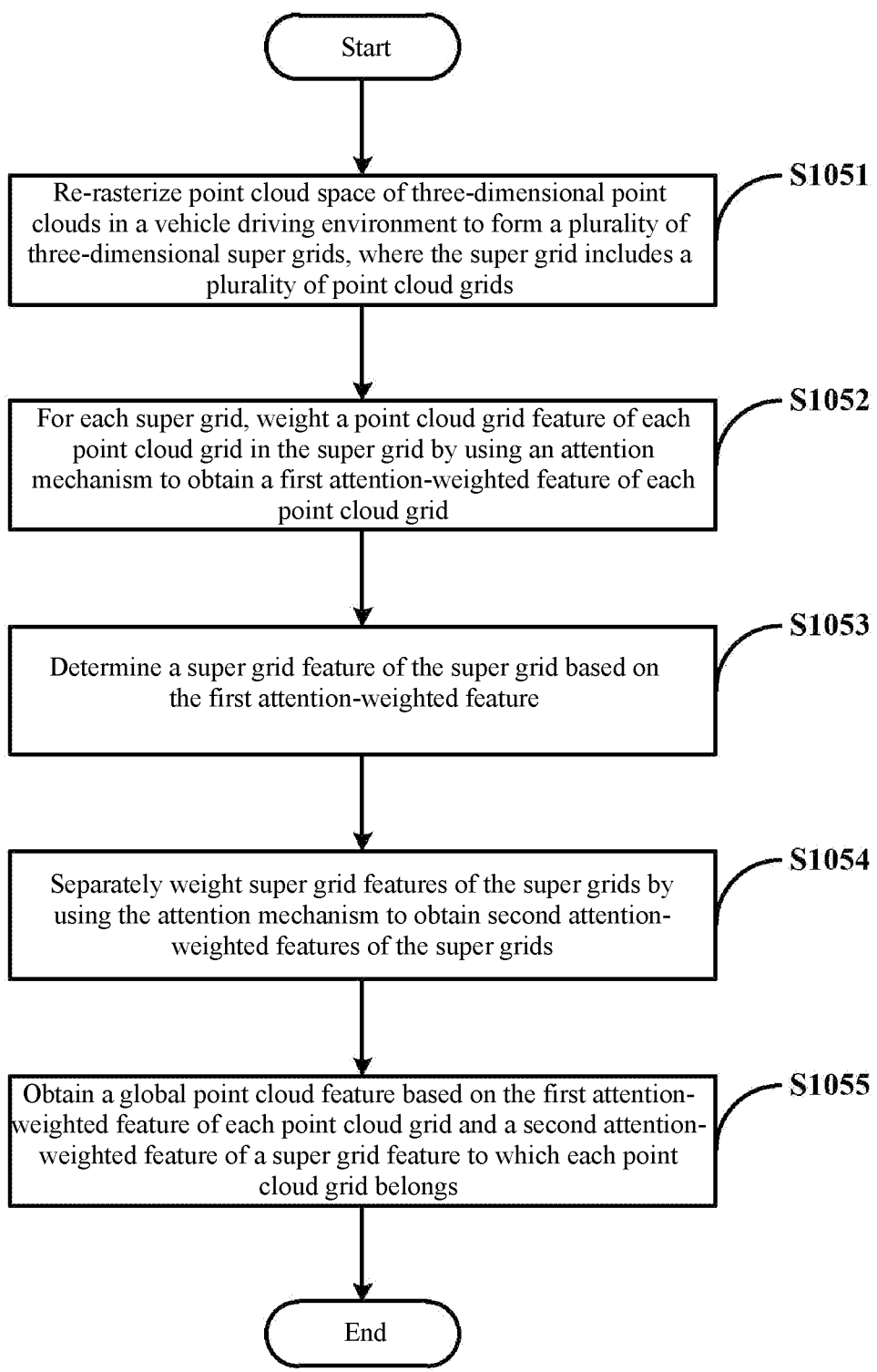
FIG. 3 is a schematic flowchart of main steps of a method for weighting a point cloud grid feature by using an attention mechanism to obtain a global point cloud feature according to an embodiment of the disclosure.

In some implementations of step S105, the point cloud grid feature may be weighted by using a multi-level attention mechanism, such that the global point cloud feature obtained fuses a global feature of the point cloud grid feature in a local area of the super grid and a global feature of the point cloud grid feature in the entire point cloud space, and therefore, global features of different levels can be taken into account when target detection is performed based on the global point cloud feature, thereby further improving the accuracy of target detection. Specifically, referring to FIG. 3, in this implementation, the point cloud grid feature may be weighted by performing step S1051 to step S1055 below to obtain the global point cloud feature.

In step S1051, the point cloud space of the three-dimensional point clouds in the vehicle driving environment is re-rasterized to form a plurality of three-dimensional super grids. The super grid includes a plurality of point cloud grids.

A method for re-rasterizing the point cloud space in this embodiment is similar to the method for rasterizing the point cloud space in step S101, and the difference is that the dimensions of the super grid obtained by performing rasterization in step S1051 are larger than the dimensions of the point cloud grid obtained by performing rasterization in step S101.

In step S1052, for each super grid, a point cloud grid feature of each point cloud grid in the super grid is weighted by using the attention mechanism to obtain a first attention-weighted feature of each point cloud grid.

In this embodiment, the point cloud grid feature may be weighted by using the global attention mechanism algorithm to obtain the first attention-weighted feature.

In step S1053, a super grid feature of the super grid is determined based on the first attention-weighted feature.

Because each super grid includes a plurality of point cloud grids, after determining the first attention-weighted feature of each point cloud grid, the super grid feature of the super grid may be determined based on first attention-weighted features of the point cloud grids in the super grid. In some preferred implementations, the first attention-weighted features of the point cloud grids in the super grid may be averaged to obtain an average feature, and the average feature may be used as the super grid feature of the point cloud super grid. A feature trend of the super grid can be represented by the average feature more intuitively, such that the accuracy of target detection performed by using the global point cloud feature determined by using the super grid feature in subsequent steps is improved.

In step S1054, super grid features of the super grids are separately weighted by using the attention mechanism to obtain second attention-weighted features of the super grids.

In this embodiment, the super grid feature may also be weighted by using the global attention mechanism algorithm to obtain the second attention-weighted feature.

In step S1055, the global point cloud feature is obtained based on the first attention-weighted feature of each point cloud grid and a second attention-weighted feature of a super grid feature to which each point cloud grid belongs.

The global point cloud feature determined based on the first attention-weighted feature and the second attention-weighted feature fuses the global feature of the point cloud grid feature in the local area of the super grid and the global feature of the point cloud grid feature in the entire point cloud space, such that global features of different levels can be taken into account when target detection is performed based on the global point cloud feature, thereby improving the accuracy of target detection.

In some implementations, the first attention-weighted feature and the second attention-weighted feature may be directly merged, and the global point cloud feature is obtained based on a feature merging result. Specifically, in this implementation, a new feature obtained by merging the first attention-weighted feature and the second attention-weighted feature may be directly used as the global point cloud feature.

In some other implementations, in addition to merging the first attention-weighted feature and the second attention-weighted feature, the super grid feature of the super grid feature to which the point cloud grid belongs may be merged, such that the global point cloud feature fuses the global feature of the point cloud grid feature in the local area of the super grid, the global feature of the point cloud grid feature in the entire point cloud space, and the super grid feature, thereby further improving the accuracy of target detection. Specifically, in this implementation, a super grid feature and the second attention-weighted feature of the super grid feature to which each point cloud grid belongs and the first attention-weighted feature of each point cloud grid may be merged, and a new feature obtained after the features are merged may be used as the global point cloud feature.

It should be noted that this embodiment of the disclosure only provides a specific implementation in which the point cloud grid feature is weighted by using a two-level attention mechanism to obtain the global point cloud feature. However, those skilled in the art can understand that, without departing from the technical principle of the disclosure, the two-level attention mechanism may be further expanded, and the point cloud grid feature is weighted by using an attention mechanism of more levels to obtain the global point cloud feature. Technical solutions after the level expansion or replacement of the attention mechanism still fall within the scope of protection of the disclosure.

For example, after step S1054, step S1055 is not performed, but the point cloud space of the three-dimensional point clouds is re-rasterized to form a plurality of three-dimensional ultra-large grids such that the ultra-large grid includes a plurality of super grids. Then, for each ultra-large grid, a super grid feature of each super grid in the ultra-large grid is weighted by using the attention mechanism to obtain a third attention-weighted feature of each ultra-large grid. Finally, the global point cloud feature is obtained based on the first attention-weighted feature, the second attention-weighted feature, and the third attention-weighted feature, in other words, the point cloud grid feature is weighted by using a three-level attention mechanism to obtain the global point cloud feature.

According to the method described in step S1051 to step S1055, a more accurate global point cloud feature with abundant levels can be obtained, and the accuracy of target detection can be significantly improved.

It should be noted that, although the steps are described in a specific order in the above embodiments, those skilled in the art may understand that in order to implement the effects of the disclosure, different steps are not necessarily performed in such an order, but may be performed simultaneously (in parallel) or in other orders, and these changes shall all fall within the scope of protection of the disclosure.

Those skilled in the art can understand that all or some of the procedures in the method of the above embodiment of the disclosure may also be implemented by a computer program instructing relevant hardware. The computer program may be stored in a computer-readable storage medium, and when the computer program is executed by at least one processor, the steps of the above method embodiments may be implemented. The computer program includes computer program code, which may be in a source code form, an object code form, an executable file form, some intermediate forms, or the like. The computer-readable storage medium may include: any entity or apparatus that can carry the computer program codes, such as a medium, a USB flash drive, a removable hard disk, a magnetic disk, an optical disc, a computer memory, a read-only memory, a random access memory, an electric carrier signal, a telecommunications signal, and a software distribution medium. It should be noted that the content included in the computer-readable storage medium may be appropriately added or deleted depending on requirements of the legislation and patent practice in a jurisdiction. For example, in some jurisdictions, according to the legislation and patent practice, the computer-readable storage medium does not include an electric carrier signal and a telecommunications signal.

Further, the disclosure further provides a computer device. In an embodiment of the computer device according to the disclosure, the computer device includes at least one processor and a storage apparatus. The storage apparatus may be configured to store a program for performing the target detection method in the above method embodiment, and the at least one processor may be configured to execute a program in the storage apparatus. The program includes but is not limited to the program for performing the target detection method in the above method embodiment. For ease of description, only parts related to the embodiments of the disclosure are shown. For specific technical details that are not disclosed, reference may be made to the method part of the embodiments of the disclosure. The computer device may be a device including various electronic devices.

Further, the disclosure further provides a computer-readable storage medium. In an embodiment of the computer-readable storage medium according to the disclosure, the computer-readable storage medium may be configured to store a program for performing the target detection method in the above method embodiment, and the program may be loaded and run by at least one processor to implement the above target detection method. For ease of description, only parts related to the embodiments of the disclosure are shown. For specific technical details that are not disclosed, reference may be made to the method part of the embodiments of the disclosure. The computer-readable storage medium may be a storage device formed by various electronic devices. Optionally, the computer-readable storage medium in this embodiment of the disclosure is a non-transitory computer-readable storage medium.

Further, the disclosure further provides a vehicle. In an embodiment of the vehicle according to the disclosure, the vehicle may include the computer device described in the above embodiment of the computer device. In this embodiment, the vehicle may be an autonomous vehicle, an unmanned vehicle, or the like. In addition, based on a type of a power source, the vehicle in this embodiment may be a fuel vehicle, an electric vehicle, a hybrid vehicle using both electric energy and fuel, a vehicle using another new energy source, or the like.

Heretofore, the technical solutions of the disclosure have been described with reference to the preferred implementations shown in the accompanying drawings. However, those skilled in the art can readily understand that the scope of protection of the disclosure is apparently not limited to these specific implementations. Those skilled in the art may make equivalent changes or substitutions to the related technical features without departing from the principle of the disclosure, and all the technical solutions with such changes or substitutions shall fall within the scope of protection of the disclosure.

What is claimed is:

1. A target detection method, comprising:
   rasterizing point cloud space of three-dimensional point clouds in a vehicle driving environment to form a plurality of three-dimensional point cloud grids, and using point cloud grids comprising three-dimensional point clouds as target point cloud grids;
   determining a convolution dilation rate corresponding to each of the target point cloud grids based on sparsity of a respective target point cloud grid, wherein the convolution dilation rate is positively correlated with the sparsity;
   dilating a sparse convolution based on the convolution dilation rate to form a dilated sparse convolution;
   extracting a point cloud grid feature of the corresponding target point cloud grid by using the dilated sparse convolution;
   weighting the point cloud grid feature by using an attention mechanism to obtain a global point cloud feature; and
   performing target detection based on the global point cloud feature.

2. The target detection method according to claim 1, wherein before the step of determining a convolution dilation rate corresponding to each of the target point cloud grids based on sparsity of a respective target point cloud grid, the method further comprises:
   obtaining point cloud grids adjacent to a current target point cloud grid within a preset neighborhood range;
   determining a grid number of target point cloud grids in the adjacent point cloud grids; and
   determining sparsity of the current target point cloud grid based on the grid number.

3. The target detection method according to claim 2, wherein the step of determining a convolution dilation rate corresponding to each of the target point cloud grids based on sparsity of a respective target point cloud grid comprises:
determining a convolution dilation rate corresponding to the current target point cloud grid based on the sparsity of the current target point cloud grid and by using the following formula:

$$\begin{cases} d_r = \lceil N \times s_1 \rceil, \dfrac{N-M}{N} = 1 \\ d_r = \left\lceil \dfrac{N}{M} \times s_2 \right\rceil, 0 \le \dfrac{N-M}{N} < 1 \end{cases},$$

wherein
$d_r$ represents the convolution dilation rate, N represents a grid number of adjacent point cloud grids, M represents the grid number of target point cloud grids in the adjacent point cloud grids, $$\dfrac{N-M}{N}$$

represents the sparsity, $s_1$ and $s_2$ represent preset hyperparameters, and $\lceil \; \rceil$ represents a ceiling operation.

4. The target detection method according to claim 1, wherein the step of weighting the point cloud grid feature by using an attention mechanism to obtain a global point cloud feature comprises:
   re-rasterizing the point cloud space of the three-dimensional point clouds in the vehicle driving environment to form a plurality of three-dimensional super grids, wherein the super grid comprises a plurality of point cloud grids;
   for each super grid, weighting a point cloud grid feature of each point cloud grid in the super grid by using the attention mechanism to obtain a first attention-weighted feature of each point cloud grid, and determining a super grid feature of the super grid based on the first attention-weighted feature;

separately weighting super grid features of the super grids by using the attention mechanism to obtain second attention-weighted features of the super grids; and obtaining the global point cloud feature based on the first attention-weighted feature of each point cloud grid and a second attention-weighted feature of a super grid feature to which each point cloud grid belongs.

5. The target detection method according to claim 4, wherein the step of obtaining the global point cloud feature based on the first attention-weighted feature of each point cloud grid and a second attention-weighted feature of a super grid feature to which each point cloud grid belongs comprises:

merging the first attention-weighted feature of each point cloud grid and the second attention-weighted feature of the super grid feature to which each point cloud grid belongs, and obtaining the global point cloud feature based on a feature merging result; or merging a super grid feature and the second attention-weighted feature of the super grid feature to which each point cloud grid belongs and the first attention-weighted feature of each point cloud grid, and obtaining the global point cloud feature based on a feature merging result.

6. The target detection method according to claim 4, wherein the step of determining a super grid feature of the super grid based on the first attention-weighted feature comprises:

averaging first attention-weighted features of the point cloud grids in the super grid to obtain an average feature, and using the average feature as the super grid feature of the point cloud super grid.

7. The target detection method according to claim 1, wherein before the step of rasterizing point cloud space of three-dimensional point clouds in a vehicle driving environment to form a plurality of three-dimensional point cloud grids, the method further comprises:

obtaining the three-dimensional point clouds in the vehicle driving environment by using a remote environment sensing device.

8. A computer device, comprising at least one processor and a storage apparatus configured to store a plurality of program codes, wherein the program codes are adapted to be loaded and executed by the at least one processor to perform a target detection method, comprising:

rasterizing point cloud space of three-dimensional point clouds in a vehicle driving environment to form a plurality of three-dimensional point cloud grids, and using point cloud grids comprising three-dimensional point clouds as target point cloud grids;

determining a convolution dilation rate corresponding to each of the target point cloud grids based on sparsity of a respective target point cloud grid, wherein the convolution dilation rate is positively correlated with the sparsity;

dilating a sparse convolution based on the convolution dilation rate to form a dilated sparse convolution;

extracting a point cloud grid feature of the corresponding target point cloud grid by using the dilated sparse convolution;

weighting the point cloud grid feature by using an attention mechanism to obtain a global point cloud feature; and performing target detection based on the global point cloud feature.

9. The computer device according to claim 8, wherein before the step of determining a convolution dilation rate corresponding to each of the target point cloud grids based on sparsity of a respective target point cloud grid, the method further comprises:

obtaining point cloud grids adjacent to a current target point cloud grid within a preset neighborhood range;

determining a grid number of target point cloud grids in the adjacent point cloud grids; and determining sparsity of the current target point cloud grid based on the grid number.

10. The computer device according to claim 9, wherein the step of determining a convolution dilation rate corresponding to each of the target point cloud grids based on sparsity of a respective target point cloud grid comprises:

determining a convolution dilation rate corresponding to the current target point cloud grid based on the sparsity of the current target point cloud grid and by using the following formula:

$$\begin{cases} d_r = \lceil N \times s_1 \rceil, \ \frac{N-M}{N} = 1 \\ d_r = \left\lceil \frac{N}{M} \times s_2 \right\rceil, \ 0 \le \frac{N-M}{N} < 1 \end{cases},$$

wherein $d_r$ represents the convolution dilation rate, N represents a grid number of adjacent point cloud grids, M represents the grid number of target point cloud grids in the adjacent point cloud grids, $$\frac{N-M}{N}$$

represents the sparsity, $s_1$ and $s_2$ represent preset hyperparameters, and $\lceil \ \rceil$ represents a ceiling operation.

11. The computer device according to claim 8, wherein the step of weighting the point cloud grid feature by using an attention mechanism to obtain a global point cloud feature comprises:

re-rasterizing the point cloud space of the three-dimensional point clouds in the vehicle driving environment to form a plurality of three-dimensional super grids, wherein the super grid comprises a plurality of point cloud grids;

for each super grid, weighting a point cloud grid feature of each point cloud grid in the super grid by using the attention mechanism to obtain a first attention-weighted feature of each point cloud grid, and determining a super grid feature of the super grid based on the first attention-weighted feature;

separately weighting super grid features of the super grids by using the attention mechanism to obtain second attention-weighted features of the super grids; and obtaining the global point cloud feature based on the first attention-weighted feature of each point cloud grid and a second attention-weighted feature of a super grid feature to which each point cloud grid belongs.

12. The computer device according to claim 11, wherein the step of obtaining the global point cloud feature based on the first attention-weighted feature of each point cloud grid and a second attention-weighted feature of a super grid feature to which each point cloud grid belongs comprises:

merging the first attention-weighted feature of each point cloud grid and the second attention-weighted feature of the super grid feature to which each point cloud grid belongs, and obtaining the global point cloud feature based on a feature merging result; or merging a super grid feature and the second attention-weighted feature of the super grid feature to which each point cloud grid belongs and the first attention-weighted feature of each point cloud grid, and obtaining the global point cloud feature based on a feature merging result.

13. The computer device according to claim 11, wherein the step of determining a super grid feature of the super grid based on the first attention-weighted feature comprises:

averaging first attention-weighted features of the point cloud grids in the super grid to obtain an average feature, and using the average feature as the super grid feature of the point cloud super grid.

14. The computer device according to claim 8, wherein before the step of rasterizing point cloud space of three-dimensional point clouds in a vehicle driving environment to form a plurality of three-dimensional point cloud grids, the method further comprises:

obtaining the three-dimensional point clouds in the vehicle driving environment by using a remote environment sensing device.

15. A vehicle, comprising the computer device according to claim 8.

* * * * *